Figure 1:
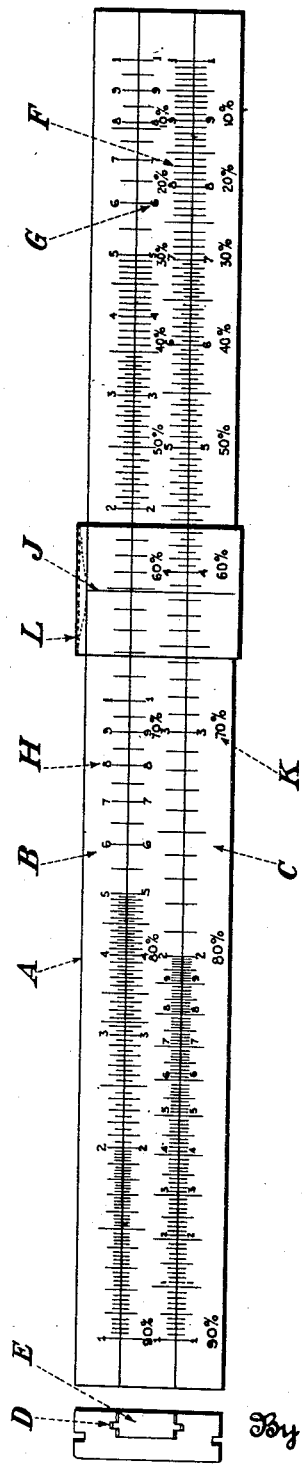

E. T. FRANKEL.
SLIDE RULE.
APPLICATION FILED JULY 16, 1920.

1,404,951.

Patented Jan. 31, 1922.

Inventor
EDWARD T. FRANKEL.
By his Attorney
Morris Hirsch.

UNITED STATES PATENT OFFICE.

EDWARD T. FRANKEL, OF NEW YORK, N. Y.

SLIDE RULE.

1,404,951. Specification of Letters Patent. Patented Jan. 31, 1922.

Application filed July 16, 1920. Serial No. 396,814.

*To all whom it may concern:*

Be it known that I, EDWARD T. FRANKEL, a citizen of the United States, and resident of New York city, in the county of New York and State of New York, have invented certain new and useful Improvements in Slide Rules, of which the following is a specification.

My present invention relates to computing apparatus and more particularly to slide rules.

One of the objects of the invention is to provide a slide rule by which certain kinds of computations frequently required in business or commerce and involving operations combining addition or subtraction with multiplication or division can be quickly and reliably performed with the ease usually achieved in the use of ordinary slide rules for performing operations involving merely multiplication and division.

Although the logarithmic slide rule has come into wide use in the engineering and other technological professions it is practically never used by men in those activities pertaining to commerce, in which there is occasion for frequently performing computations involving multiplication or division. Sales executives, sales managers and accountants, for instance, have frequent occasion to perform long series of computations of this sort, as will be exemplified below. One of the main reasons why slide rules are not in use by men in these occupations is because the ordinary slide rule does not adapt itself to many computations which merchants and accountants particularly are frequently called upon to make in the performance of their regular duties. Some of the most important of commercial computations for which there is frequent occasion and which in many cases it is desirable to perform rapidly, require the performance of subtraction or addition besides multiplication and division, and the ordinary slide rule is, of course, not ideally applicable to such complex computations. Thus, a person wishing to use a slide rule for performing computations of the type mentioned is compelled to perform the operations of addition or subtraction mentally or in writing and, therefore, would not obtain the benefit of the speed and reliability that are ordinarily derived from the use of slide rules. Moreover, there is occasion for frequent errors where some parts of the operation are performed on paper or mentally and other parts on the slide rule. For these reasons, these processes have ordinarily been worked out laboriously by long hand.

As illustrative of commercial problems of the above type, reference may be had to calculations involving successive or chain discounts. Where, as is customary in the sale of many commodities, two or more discounts are allowed, each successive discount must be taken on the basis of the net selling price derived after deducting all previously applied discounts. It is important to determine the net selling price and in many cases also the equivalent discount, that is, the single discount which when applied to the gross selling price will result in the same net selling price as that derived from applying the separate discounts successively. In practice, there frequently arises also the related problem of determining what extra discount added to certain successive discounts will result in a given equivalent discount. It is also sometimes important in making certain adjustments to compare two series of discounts for the purpose of ascertaining which is the greater and what extra discount must be added to the smaller to equalize the two.

Problems in successive or chain discounts are ordinarily solved by first subtracting each discount percentage from unity, and then multiplying the gross selling price by the product of the differences, the combined product giving the net selling price. For instance, if the gross selling price is $512. and the discounts successively are $12\frac{1}{2}\%$, $25\%$ and $37\frac{1}{2}\%$, the problem of finding the net selling price would be solved as follows: On paper or mentally each of the discounts would be subtracted from unity as follows: $1-12\frac{1}{2}\%=87\frac{1}{2}\%$; $1-25\%=75\%$; $1-37\frac{1}{2}\%=62\frac{1}{2}\%$. Then by actual multiplication, or if desired by means of the slide rule the product of $512\times.875\times.75\times.625$ would give the net selling price. If the equivalent discount is desired, the product of the decimal fractions must be found and subtracted from unity. When in the conduct of business a considerable number of such calculations must be made in rapid succession, the likelihood for error in the successive processes of subtraction and multiplication is considerable. Moreover, the performance of these computations with the care requisite to produce accurate results is inconsistent with speed.

In my invention, I have provided a slide rule with which chain discount computations required in commercial affairs can be performed with the same facility as can simple processes of multiplication or division with the ordinary slide rule, the need for any process of addition or subtraction either mentally or in writing being totally eliminated.

To avoid circumlocution, I will define a series of graduations on a slide rule as "graduation scale" and the series of number designations corresponding to the graduations as "number scale."

To perform the complex chain discount and similar computations with the facility usually achieved for ordinary multiplication or division by slide rules, I have provided a new slide rule employing the same logarithmic graduation scales as are now in use on engineers' slide rules, new number scales being employed instead of, or preferably in addition to, the usual number scales.

The usual number scale provided on slide rules consists of the anti-logarithms corresponding to the logarithms represented by the distances of the graduations from the beginning of the scale. In my invention I employ the same graduation scales and provide a new number scale which is complementary to the usual number scale, being derived from the latter according to a definite simple rule to be stated more specifically hereinafter, the numbers of the new scale being preferably expressed in terms of percentages. By the use of my slide rule, chain discount computations are accurately performed, as will appear below, by reading the discount percentages themselves upon the new number scale, manipulating the slide rule as for ordinary multiplication or division, and reading the results required directly from the slide rule to the total elimination of all separate processes of subtraction or addition, either mental or written.

Figure 2:
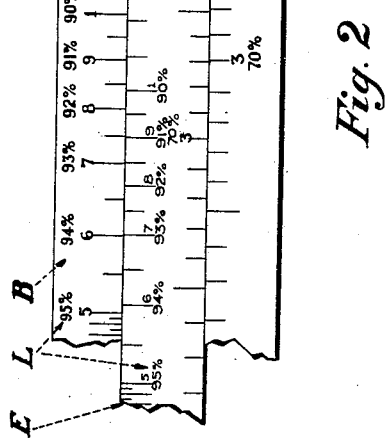

In the accompanying drawings, Fig. 1 is a plan of a slide rule showing an embodiment of my invention and Fig. 2 is a fragmentary view on a larger scale of another and preferred embodiment, the slide being shown somewhat withdrawn.

Referring now to the accompanying drawings, I have shown a slide rule comprising a main piece A including two fixed parallel bars B and C and having a track D therebetween in which is guided a slide E. Upon one edge of the slide E is provided the usual logarithmic graduation scale F running substantially the length of the slide and at the other edge of the slide is provided a logarithmic scale G extending over only half the length of scale F, two of the scales G appearing in succession. Upon the bar C appears a scale identical with the adjacent scale F on the slide and upon the bar B is a double scale identical with the double scale G on the slide. Number scales H correspond to the graduation scales, the number in each case being the anti-logarithm of the distance of the graduation from the beginning of the scale. The usual runner L having a hairline J is mounted upon the slide rule to be used in the usual manner. The slide rule thus far described is identical with that in common use by engineers.

My novel slide rule is preferably produced by providing at least upon the coordinated scales F and C of this well known slide rule a new number scale preferably expressed in percentages as shown at K. Each percentage designation represents a number equal to one-tenth the difference between 10 and the anti-logarithm corresponding to the graduation at that point. Thus 80% (i. e. 0.80) on the new number scale is adjacent to the number 2 on the old number scale, since 80% equals one-tenth of 10 minus 2; similarly 70% (i. e. 0.70) on the new number scale is adjacent to the number 3 on the old or usual number scale, since 70% equals one-tenth of 10 minus 3, etc. Thus in the construction of Fig. 1 the adjoining scales on one of the bars and on the slide are each preferably provided with two sets of numerical designations or number scales. The first number scale in each case consists of the usual set of anti-logarithms corresponding to the distances of the associated scale divisions from the beginning of the scale. The second (new) number scale in each case consists of a set of numbers, each derived from the corresponding number in the first number scale by subtracting the same from 10 and dividing the difference by ten, the quotient being expressed preferably in percentages. The additional number scale is preferably in a character of type clearly distinguishable from that of the old scale, and may be of a different color.

To exemplify the use of my new slide rule it will be shown how the illustrative problem above referred to can be solved thereby. Let it be desired to find the equivalent discount and the net selling price where the gross selling price is $512. and the net discounts are $12\frac{1}{2}$%, 25% and $37\frac{1}{2}$%. The slide E is drawn to the left until the end of its scale is in registry with the scale division corresponding to $12\frac{1}{2}$%; the runner is then moved to the 25% mark on the slide and the end of the slide scale is drawn up to the hairline on the runner; similarly the third discount of $37\frac{1}{2}$% is applied by drawing the hairline on the runner to the division corresponding to $37\frac{1}{2}$% on the slide scale whereupon the equivalent single discount will be read upon the percentage number scale on bar C as 59%. To find the selling price the slide is moved until its end registers with the hairline on the runner, whereupon the runner is displaced to the scale division 512 and the net selling price will be represented, directly opposite, on the old scale on bar C as $210. Thus by the use of my slide rule all need for performing mental operations in the process of computing chain discounts is entirely obviated. The data for computing equivalent discounts and net selling prices, as well as the results of the computations, are directly set upon and read from my slide rule.

The preferred scale of Fig. 2 is similar to that of Fig. 1 except that the double graduation scales both on the bar B and on the slide E are also provided with a new percentage scale L. The new number scale, it will be noted, is derived by taking one per cent of the difference between 100 and the anti-logarithm corresponding to the logarithm represented by the distance from the graduation to the beginning of the left-hand scale. In this connection it should be observed that the anti-logarithms corresponding to the right-hand half of the double scale G, although usually shown in ordinary digits, are actually ten times as great; that is, this scale covers the range from 10 to 100, whereas the left-hand scale covers from 1 to 10.

That my invention will operate to give the equivalent discount and the net selling price correctly in every case can be rigorously demonstrated by mathematical methods and can, of course, be proved empirically.

It will thus be seen that by the simple expedient of providing upon an ordinary engineer's slide rule certain definite percentage markings, I produce a slide rule which is thoroughly practical for the use of commercial men and entirely obviates the frequent errors occurring in the course of computations requiring besides multiplication or division further mental or written processes out of the scope of the ordinary slide rule. By totally eliminating these mental or written processes, my slide rule eliminates chances of errors, as previously noted, and increases the speed of performing the computations.

My invention is not limited in its commercial applications to the computation of discounts but is also of special value to the accountant. In the computation of manufacturing costs, accountants have frequent recourse to the depreciation formula $$r = 1 - \sqrt[n]{\frac{s}{c}}$$

where $c$ represents the cost of an asset, such as a machine, $s$ its estimated scrap or salvage value at the end of $n$ years, $n$ the estimated productive life of the asset, and $r$ the constant annual rate of depreciation to be applied to the book value of the asset.

In most cases the scrap value is only a small percentage of the cost so that the fraction under the radical sign may be of the order of .05. In extracting the $n$th root of a decimal fraction where $n$ is an integer or fraction representing the number of years of use, the accountant will almost invariably experience considerable difficulty in manipulating the ordinary slide rule or in using ordinary logarithmic tables. Considerable care is required to determine, for instance, the sixth root of .05 by ordinary methods, using either an engineer's slide rule or logarithmic tables. After the $n$th root is thus found, the accountant must then subtract his result from unity to obtain the rate of depreciation desired. Besides the difficulties above pointed out the accountant working by the old method is, in general, handicapped in having to operate according to a formula.

By the use of my slide rule the runner will be set to the ratio of the scrap value to the cost. The actual distance from this reading to the end of the scale will be divided by the number of years (which can be easily effected with a scale of equal parts or a pair of proportional dividers) and the resultant length measured off from the end of the scale, at which point the percentage read from the percentage scale will give the rate of depreciation directly, without any likelihood of error and with the total elimination of any necessity for bothering with positive mantissas and negative characteristics in order to locate decimal points, or for performing subtractions, or for carrying in mind or working according to a formula.

In the use of my slide rule for such computations it is preferable to employ the percentage scale L, that is, the scale running up to 99%. Since the scrap value in actual practice is always in excess of one per cent, all the problems encountered in practice are within the range of this scale. If, as is frequently the case, the ratio $s/c$ is already given, or if the scrap value and cost are such round numbers that the ratio is obvious, the runner can at once be set to the ratio, using the left or right number scale on the bar B according as the ratio is less than or greater than 0.10.

In other cases the reading indicating the ratio is found by dividing the scrap value by the cost, in the usual way, using the double scales on the slide E and the bar B. In performing this division one would ordinarily have a choice in using either the left or the right scale on the bar B. In depreciation computations, however, we use the left or the right scale on the bar B according as the scrap value is less than or greater than 10% of the cost.

To exemplify the application of my slide rule to such computations, assume that the cost of a machine is $2400 and its scrap value $84 after 10 years of use. By inspection we see that 84 is less than 10% of 2400. Accordingly we set the runner to division 84 on the left-hand scale, bring 24 on the slide to the hairline of the runner and opposite the index of the slide read the quotient .035 on the number scale or its complement 96.5% on the percentage scale. To this point we move the runner. Using a scale of equal parts or a pair of proportional dividers, divide the distance from the hairline to the right end of the percentage scale by the number of years, in this case 10, and at one-tenth the length measured from the right end will be read at once on the percentage scale the depreciation rate, 28.5%.

As a further illustration, assume the cost as $1200, the scrap value as $186, the estimated life again being taken as 10 years. By inspection the scrap value is found to be greater than 10% of the cost and in dividing we set 12 on the slide against 186 on the right-hand number scale. The quotient 0.155 will be opposite 84.5% on the percentage scale. One-tenth the distance from the right end of the percentage scale to this point will be at 17.0%, the required depreciation rate.

The user of my slide rule in the case of the computations of commerce hereinbefore noted and in other cases, sets percentages and reads percentages from the percentage scale. Whenever he seeks results not in percentages, such as net selling prices, for instance, he reads his result upon the old number scale. As a percentage reading would then have no meaning to him, all danger of confusion between the two number scales is inherently avoided and my slide rule may thus be used for computations of the character indicated with the same facility as is secured by using ordinary slide rules for multiplication and division merely.

The preferred form of my slide rule includes all of the elements of the ordinary engineer's slide rule, so that by my improvement I provide a universal slide rule useful both for engineering computations and for computations of the general types above illustrated ordinarily required by sales managers, accountants and the like. It will be understood, however, that if a slide rule is desired for certain limited classes of computations only, some of the graduation scales and some of the number scales may be omitted.

Although I prefer to express my new number scales in percentages as above indicated, it will be obvious that the same may be expressed by other symbols if desired, such symbols representing broadly a series of numbers complementary to the corresponding anti-logarithms for the graduations; in other words, each new series of numbers is determined according to a definite rule from the series on the ordinary engineer's slide rule.

It will be understood that my new slide rule is adapted for uses other than those specifically pointed out above, and that the principle of my invention is applicable to slide rules provided with other graduation scales than those provided on the engineer's slide rule referred to herein.

I claim:—

1. A slide rule including a pair of relatively slidable logarithmic scales, having their graduations identified by numerical designations complementary to the corresponding anti-logarithms.

2. A slide rule including a pair of relatively slidable logarithmic scales having their graduations identified by the corresponding anti-logarithms, and further identified by designations complementary to the corresponding anti-logarithms.

3. A slide rule including a pair of relatively slidable logarithmic scales having their graduations identified by the corresponding anti-logarithms and further identified by designations complementary to the corresponding anti-logarithms, each complementary designation being one-tenth the difference between 10 and the corresponding anti-logarithm.

4. A slide rule including a pair of relatively slidable logarithmic scales having their graduations identified by the corresponding anti-logarithms and further identified by designations complementary to the corresponding anti-logarithms, each complementary designation being one-tenth the difference between 10 and the corresponding anti-logarithm and being represented as a percentage.

5. A slide rule including a main piece having a first fixed bar, a second fixed bar and a slide movable therebetween, a logarithmic graduation scale on the first bar, a number scale corresponding thereto, each number being equal to one-tenth the difference between ten and the corresponding anti-logarithm, a scale on the second bar comprising two logarithmic scales of half length in series, a number scale corresponding to the latter, each number being equal to one one-hundredth the difference between one hundred and the corresponding anti-logarithm, said slide having graduation and number scales at one edge identical with the scales on the first bar, and graduation and number scales on the other edge identical with the scales on the second bar.

6. A slide rule including a main piece having a first fixed bar, a second fixed bar, a slide movable therebetween, a logarithmic graduation scale on the first bar, an anti-logarithmic number scale corresponding thereto, a second number scale, each number being equal to one-tenth the difference between ten and the corresponding anti-logarithm and expressed in terms of percentages, a scale on the second bar comprising two logarithmic graduation scales in series, each of half length, each said scale having an anti-logarithmic number scale, a second number scale on said double graduation scale, each number of said second scale being equal to one one-hundredth the difference between one hundred and the anti-logarithm corresponding to the distance between its scale division and the extreme end division of the slide rule and expressed in terms of percentages, said slide having graduation and number scales at one edge identical with the scales on the first bar, and graduation and number scales on the other edge identical with the scales on the second bar, and a single hairline slidable runner upon said main piece.

Signed at New York, N. Y. in the county of New York and State of New York this tenth day of July, 1920 A. D.

EDWARD T. FRANKEL.